G. A. NORTON.
DUPLEX ROCKING FIFTH WHEEL.
APPLICATION FILED MAY 15, 1918.
1,334,113.
Patented Mar. 16, 1920.
2 SHEETS—SHEET 1.
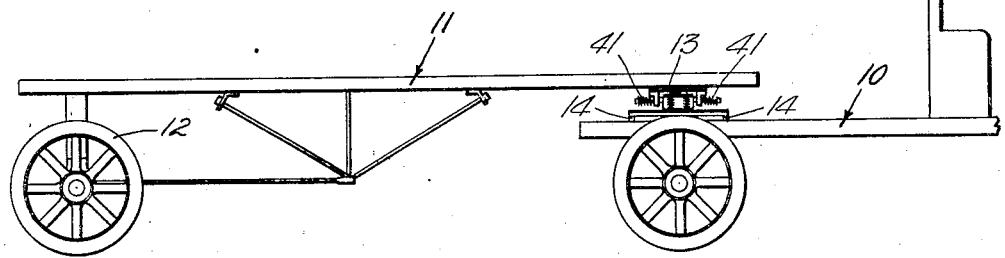
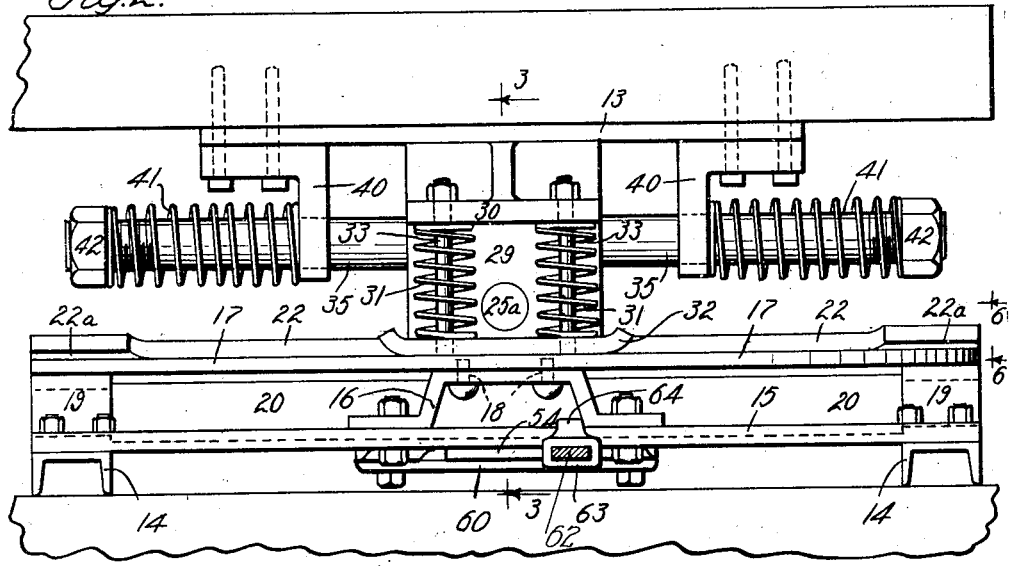
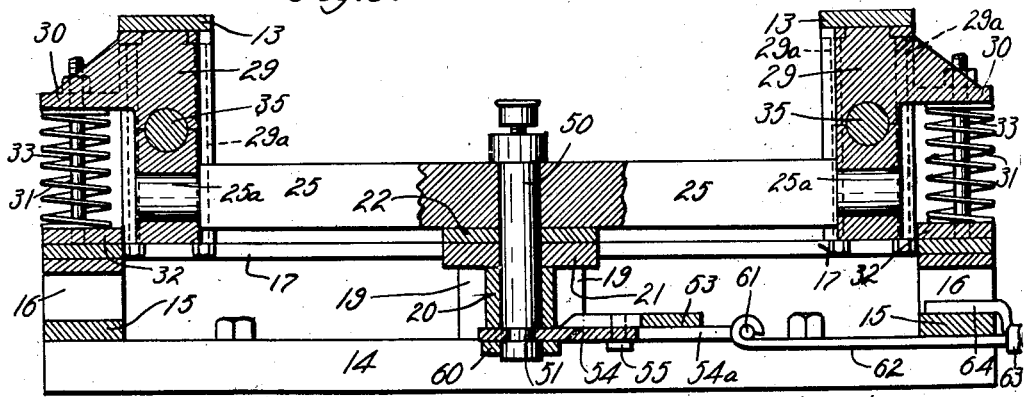
Inventor
Guy A. Norton
by [signature]
his Attorney G. A. NORTON.
DUPLEX ROCKING FIFTH WHEEL.
APPLICATION FILED MAY 15, 1918.
1,334,113.
Patented Mar. 16, 1920.
2 SHEETS—SHEET 2.
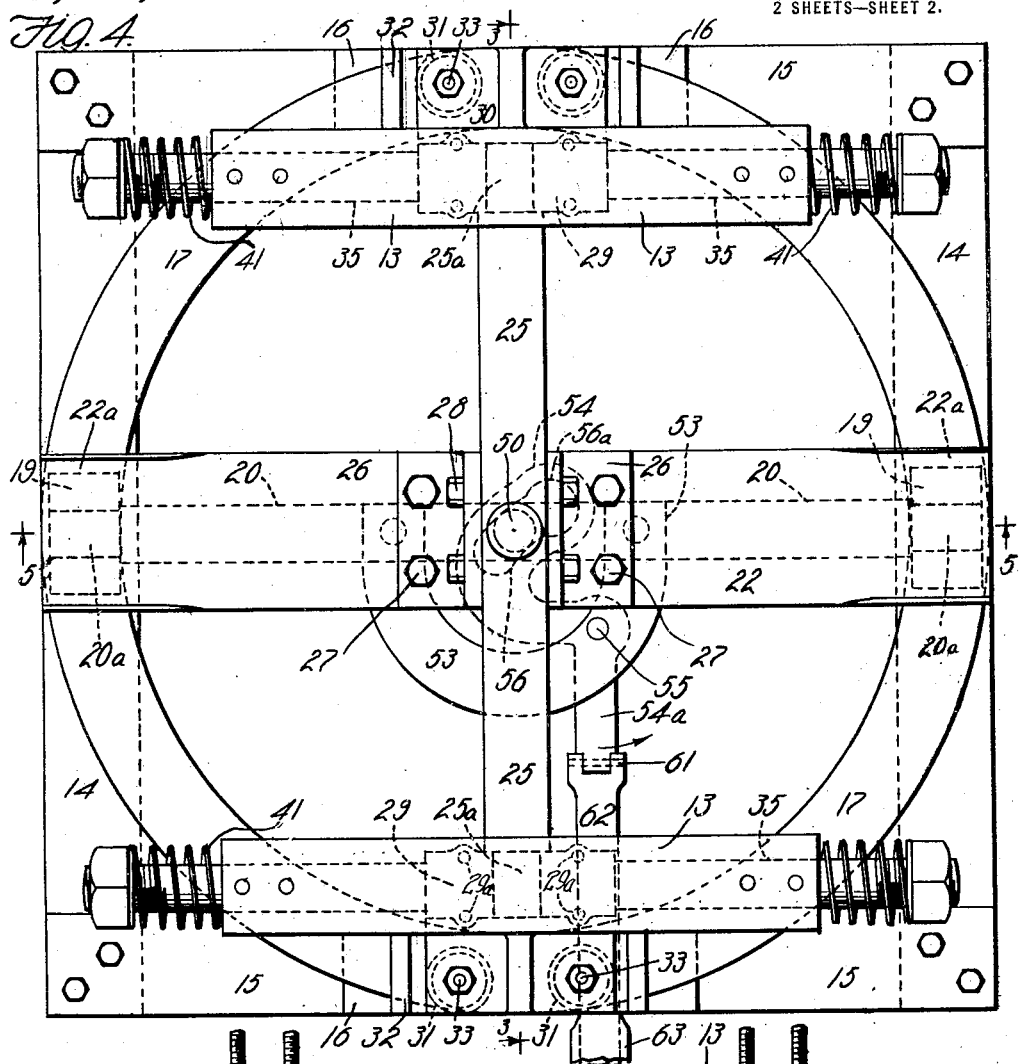
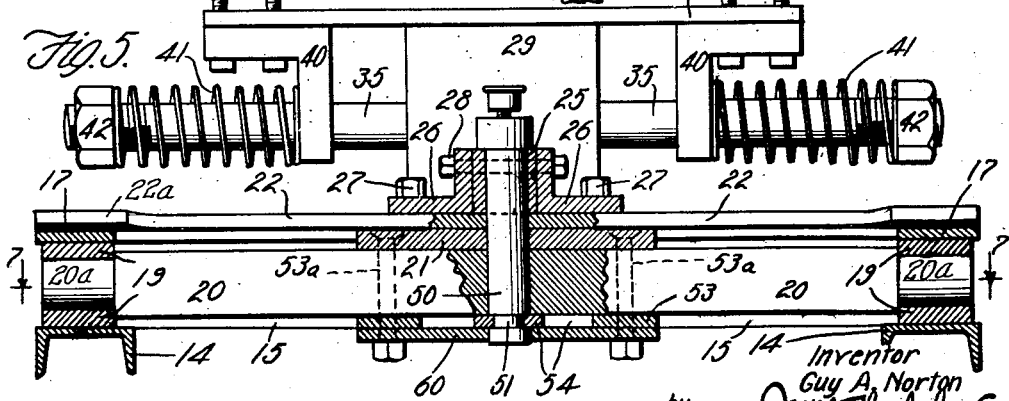
Inventor
Guy A. Norton
by
his Attorney

UNITED STATES PATENT OFFICE.

GUY A. NORTON, OF LOS ANGELES, CALIFORNIA, ASSIGNOR TO LOS ANGELES TRAILER COMPANY, OF LOS ANGELES, CALIFORNIA, A CORPORATION OF CALIFORNIA.

DUPLEX ROCKING FIFTH-WHEEL.

1,334,113.  Specification of Letters Patent.  Patented Mar. 16, 1920.

Application filed May 15, 1918. Serial No. 234,830.

*To all whom it may concern:*

Be it known that I, GUY A. NORTON, a citizen of the United States, residing at Los Angeles, in the county of Los Angeles, State of California, have invented new and useful Improvements in Duplex Rocking Fifth-Wheels, of which the following is a specification.

This invention relates to fifth wheel devices and it particularly relates to devices adapted for use to support the forward end of a trailer platform or frame upon the rear end of a vehicle, such as a truck. A truck frame may be effectively lengthened by using a following or trailer frame equipped with wheels at its rear ends, the forward end of the trailer frame being supported upon the rear end of the truck. It is a specific object of this invention to provide a simple and effective device, which although useful in other situations wherever a fifth wheel of this general character may be used, is particularly useful in such a situation as is herein described; allowing the trailer and truck frames to have a certain amount of relative motion induced by unevenness or side tilt of the road surface, etc.

The device which I hereinafter explain in detail allows all the necessary relative movements between the truck and trailer frames, including both twisting movements and movements due to passage around curves and at the same time effectively supports the forward end of the trailer frame in whatever position the device may be; and also acts to absorb any longitudinal shocks between the two frames.

Other details, features and accomplishments of this invention, and of a preferred form of device embodying the invention, are explained in the following specification; reference being had for this purpose to the accompanying drawings in which Figure 1 is a side elevation showing my device in use; Fig. 2 is an enlarged side elevation showing my device in use; Fig. 3 is a section of the device taken as indicated by line 3—3 on Fig. 2; Fig. 4 is a plan; Fig. 5 is a section taken as indicated by line 5—5 on Fig. 4; and Fig. 6 is a fragmentary elevation taken as indicated by line 6—6 on Fig. 2.

In the drawings I have shown a truck body at 10 and a trailer frame or platform at 11 whose rear end is supported upon wheels 12. The forward end of the trailer frame projects over the rear end of the truck frame and rests upon and is supported by the upper members 13 of my device. These members 13 are movably supported upon and by the other parts of the device now about to be described; and the base 14 of my device rests upon and is secured to the frame of the truck. The parts 13 and 14 may be permanently secured to the trailer and truck frames, respectively, by any suitable means; and the device is so made that when it is desired to separate the trailer and truck a simple operation suffices to release certain parts of the device which are taken off with the trailer frame, allowing the remainder of the device to remain with the truck frame.

The base 14 may preferably be composed of two inverted channels cross connected at the ends by two flat bars 15. Upon the central parts of these bars 15 there are two oppositely located brackets 16 which serve as supports for the circle plate 17, the circle plate being riveted or otherwise secured to these brackets as indicated at 18. The circle plate also rests upon the bearing blocks 19 in which the lower rock shaft 20 is journaled. This rock shaft is preferably square and has its ends reduced as shown at 20ª and journaled in the bearing blocks 19. Bearing blocks 19 rest on the base channels 14. Above the rock shaft 20 there is a spacer block 21, above which is placed the rock plate 22. This rock plate 22 in its normal position stands longitudinally over rock shaft 20 and its ends rest upon the circle plate 17, these ends being bent up at their edges as shown at 22ª so that the ends of the rock plate are more or less curved to facilitate its transverse rocking on the circle plate 17. Immediately above the rock plate there is an upper transverse rock shaft 25 which is permanently secured to the rock plate through the medium of two angle plates 26 secured by bolts 27 to the rock plate and secured by bolts 28 to the rock shaft 25. Rock shaft 25 has its reduced ends 25ª journaled in blocks 29. Blocks 29 have outwardly extending brackets 30 under which compensation springs 31 are confined between the brackets and shoes 32; the shoes being carried on the lower ends of bolts 33 which pass up through brackets 30. Shoes 32 bear on circle plate 17. Blocks 29 each carry a longitudinal rod or shaft 35 preferably set tightly in the blocks. The blocks may be formed in halves and bolted together by bolts 29ª. On the upper surface of each bracket 30 the upper plate member 13 slidably rests. To the outer ends of the plate members 13 there are secured brackets 40, bolts being used for this purpose which also serve the purpose of securing the upper members 13 to the trailer frame. Brackets 40 extend around the longitudinal shafts 35 and outside each bracket there is a compensation spring 41 around each end of each shaft, nuts 42 being provided for adjusting the amount of initial tension on these springs. Any longitudinal shock may be absorbed by the springs 41; the members 13 sliding longitudinally back and forth on blocks 29.

The pivot about which horizontal turning movement occurs is a king pin 50 which passes down through upper rock shaft 25, rock plate 22, spacer 21, and through lower rock shaft 20. The lower end of king pin 50 has an annular groove 51 just below the lower edge of shaft 20. A semi-circular bracket and guide plate 53 is secured to the under side of rock shaft 20 and a lock arm 54 is pivoted at 55 to this bracket 53. The bolts 53ª which secure bracket 53 to rock shaft 20 also serve to secure spacer block 21 to rock shaft 20. Lock arm 54 has a slot 56 in its end of just sufficient width to engage the reduced portion 51 of pin 50; and this it does when in the position illustrated. When however the arm is swung in the direction indicated by the arrow an enlarged part 56ª of the slot comes into register with the pin 50 so that the pin may then be removed. The slotted end of the lock arm moves between the lower surface of rock shaft 20 and a guide plate 60 below, this guide plate being mounted directly under and against the ends of semi-circular bracket 53. The outer part of bracket 53 is bent up to a plane above its ends which are secured under the rock shaft 20; so that the under surface of the bracket is in the plane of the lower surface of rock shaft 20. This is shown in Fig. 3. The outer arm 54ª of the lock arm is provided with a hinge at 61 to accommodate the swinging motion of the lock arm with rock shaft 20, and an extension handle arm 62 is hinged thereto. On this handle arm there is a slider 63 adapted to be moved inwardly along the arm and having a hook or prong 64 to hook over bar 15 inside the bracket 16 when the parts are in the position illustrated, thus holding the king pin 50 securely locked. By releasing the king pin and removing it the upper parts of the device may be freely lifted off the lower parts; the device parting on the plane of the upper surface of circle plate 17.

When the truck and trailer are driven around a curve the upper parts of the device rotate around the king pin as a center. Most of the weight is borne by the transverse and longitudinal rock shafts 25 and 20; but some weight is at all times borne by the compensation springs 31 and shoes 32 resting on circle plate 17 and also by rock plate 22 resting on circle plate 17. When any relative rotation occurs about king pin 50 then the rock plate 22 moves away from its normal longitudinal position over rock shaft 20, remaining at all times at right angles with transverse rock shaft 25. Thus no matter how much turning movement there may be there is always a suitable and sufficient provision for the rocking supporting of the forward end of the trailer; and this is true until a motion of 90° is reached. Any side tilt (relative) between the truck and trailer causes compression of compensating springs 31 on one side or another and causes the whole upper part of the device to rock transversely on the lower rock shaft 20 and on the rock plate 22. The amount of such transverse tilting or rocking is limited only by the proportions and dimensions of the device; but it is somewhat opposed by the springs 31. These springs thus, to some extent, support the forward end of the trailer against side tip; they give an effect somewhat as if the forward end were not supported at a single point but at two transversely spaced points, and thus add to the stability of the trailer. Any longitudinal rocking (which may be caused for instance by the trailer wheels dropping into a hollow) causes the upper parts of the device to tilt about the transverse rock shaft 25. Any combination of these two relative movements between the truck and the trailer causes a corresponding combination of tilting movements in the device itself.

In whatever position the parts of the device may be, it will be seen that rock plate 22 is always at right angles to the transverse rock shaft 25; and that the rock plate is always longitudinal of the pull (the draft pull of the trailer) which is being exerted on the king pin 50. This plate therefore has a very strong tendency and effect of holding the king pin against being bent back by the draft pull.

The two rock shafts connected by the central vertical pin may be regarded as a universal motion device allowing side tilt of the upper supported member or members in all directions and allowing free swinging of the upper members around in a horizontal plane. The springs 31 with their shoes bearing on circle plate 17, perform the function of resiliently limiting the side tilt of the upper parts (and of the trailer), without limiting the tilt in a fore and aft direction. And this means of limiting the side tilt is always effective transversely of the trailer because the springs 31, etc., swing around with the transverse rock shaft 25, and the rock plate 22 swings around with the upper rock shaft 25 so that it at all times performs its function regardless of the relative position of the two rock shafts.

It will now be readily understood how my device allows all the necessary movements between the truck and trailer frames and at the same time effectively connects the two frames with an effectual and strong draft connection. I have gone somewhat into detail in explaining the specific structures of a preferred form of this device; but I do not thereby limit myself to the specific details herein described but rather reserve to myself all such changes and modifications as may occur to those skilled in the art or as may fall within the scope of the following claims.

Having described a preferred form of my invention, I claim:

1. In a device of the character described, the combination of a base adapted to be mounted on a vehicle part, a supported member adapted to be secured to and support another vehicle part; and supporting and swiveling means between the base and the supported member embodying a longitudinal rock shaft, a normally transverse rock shaft, a central vertical king pin by which the transverse rock shaft is mounted on the longitudinal rock shaft, the upper supported member being supported on the transverse rock shaft, a stationary non-tilting circle plate, and means secured to and turning horizontally with the transverse rock shaft about the vertical pin for supporting the pin against being bent over in a direction transverse to the transverse rock shaft, said means embodying a plate secured to the transverse rock shaft and extending transversely thereof with its ends resting on the stationary circle plate.

2. In a device of the character described, the combination of a base adapted to be mounted on a vehicle part, a supported member adapted to be secured to and support another vehicle part; and supporting and swiveling means between the base and the supported member embodying a longitudinal rock shaft, a normally transverse rock shaft, a central vertical king pin by which the transverse rock shaft is mounted on the longitudinal rock shaft, the upper supported member being supported on the transverse rock shaft, a stationary non-tilting plate, and means secured to and turning horizontally with the transverse rock shaft about the vertical pin for supporting the pin against being bent over in a direction transverse to the transverse rock shaft, said means bearing on the stationary circle plate allowing the transverse rock shaft and vertical pin to tilt on the longitudinal shaft.

3. In a device of the character described, the combination of a base adapted to be mounted on a vehicle part, a supported member adapted to be secured to and support another vehicle part; and supporting and swiveling means between the base and the supported member embodying a longitudinal rock shaft, a normally transverse rock shaft, a central vertical king pin by which the transverse rock shaft is mounted on the longitudinal rock shaft, the upper supported member being supported on the transverse rock shaft, a stationary circle plate, and means secured to and turning horizontally with the transverse rock shaft about the vertical pin for supporting the pin against being bent over in a direction transverse to the transverse rock shaft, said means embodying a plate secured to the transverse rock shaft and extending transversely thereof with its ends resting on the circle plate, the ends of said plate being convex on their under sides where they bear on the circle plate to allow the transverse rock shaft and the vertical pin to tilt on the longitudinal rock shaft.

4. In a device of the character described, the combination of a base adapted to be mounted on a vehicle part, a supported member adapted to be secured to and support another vehicle part; and supporting and swiveling means between the base and the supported member embodying a longitudinal rock shaft, a normally transverse rock shaft, a central vertical king pin by which the transverse rock shaft is mounted on the longitudinal rock shaft, the upper supported member being supported on the transverse rock shaft, a stationary circle plate, and means secured to and turning horizontally with the transverse rock shaft about the vertical pin for supporting the pin against being bent over in a direction transverse to the transverse rock shaft, said means embodying a plate secured to the transverse rock shaft and extending transversely thereof with its ends resting on the circle plate, the ends of said plate being convex on their under sides where they bear on the circle plate to allow the transverse rock shaft and the vertical pin to tilt on the longitudinal rock shaft, and resilient means carried at the outer ends of the transverse rock shaft to resiliently limit the amount of tilting of that shaft on the longitudinal rock shaft.

5. In a device of the character described, the combination of a base, a longitudinal rock shaft mounted thereon, a stationary circle plate mounted thereon, a normally transverse rock shaft over and across the longitudinal rock shaft, a vertical central pin connecting the two shafts, a normally longitudinal plate connected to the transverse rock shaft and having its ends bearing on the circle plate, spring means carried on the ends of the transverse rock shaft and bearing on the circle plate, and members carried on the ends of the transverse rock shaft adapted to be secured to and support a vehicle part.

6. In a device of the character described, the combination of a base, a longitudinal rock shaft mounted thereon, a stationary circle plate mounted thereon, a normally transverse rock shaft over and across the longitudinal rock shaft, a vertical central pin connecting the two shafts, a normally longitudinal plate connected to the transverse rock shaft and having its ends bearing on the circle plate, bearing blocks carried on the ends of the transverse rock shaft, shoes suspended from said blocks and resting on the circle plate, springs over the shoes to resiliently oppose the movement of the bearing blocks toward the circle plate, longitudinal shafts in said blocks, members carried on said shafts adapted to be secured to and support a vehicle part, and spring means to resiliently oppose the longitudinal movement of said members.

7. In a device of the character described, the combination of a base adapted to be connected to a vehicle part, a rock shaft on the base, another rock shaft normally transverse to the first mentioned shaft, a vertical pin connecting the two rock shafts to allow swinging movement between them, a member carried by the second mentioned rock shaft and adapted to be connected to another vehicle part, a stationary non-tilting circle plate, and a member rigid with respect to the second mentioned shaft and extending transversely thereto and resting on the circle plate.

8. In a device of the character described, the combination of a base adapted to be connected to a vehicle part, a rock shaft on the base, another rock shaft normally transverse to the first mentioned shaft, a vertical pin connecting the two rock shafts to allow swinging movement between them, a member carried by the second mentioned rock shaft and adapted to be connected to another vehicle part, a stationary non-tilting circle plate, and a plate rigid with respect to the second mentioned shaft and extending transversely thereto normally over the first mentioned shaft with its ends resting on the circle plate, its ends having lower curved surfaces to rock on the circle plate.

9. In a device of the character described, the combination of a base adapted to be connected to a vehicle part, a rock shaft on the base, another rock shaft normally transverse to the first mentioned shaft, a vertical pin connecting the two rock shafts to allow swinging movement between them, a member carried by the second mentioned rock shaft and adapted to be connected to another vehicle part, a stationary non-tilting circle plate, and resilient supporting means for the ends of the second mentioned shaft slidingly resting on the stationary circle plate, said resilient means opposing and resiliently limiting the rocking movement of said second mentioned shaft on said first mentioned shaft as an axis.

In witness that I claim the foregoing I have hereunto subscribed my name this 2d day of May, 1918.

GUY A. NORTON.

Witness:
VIRGINIA I. BERINGER.